Figure 1:
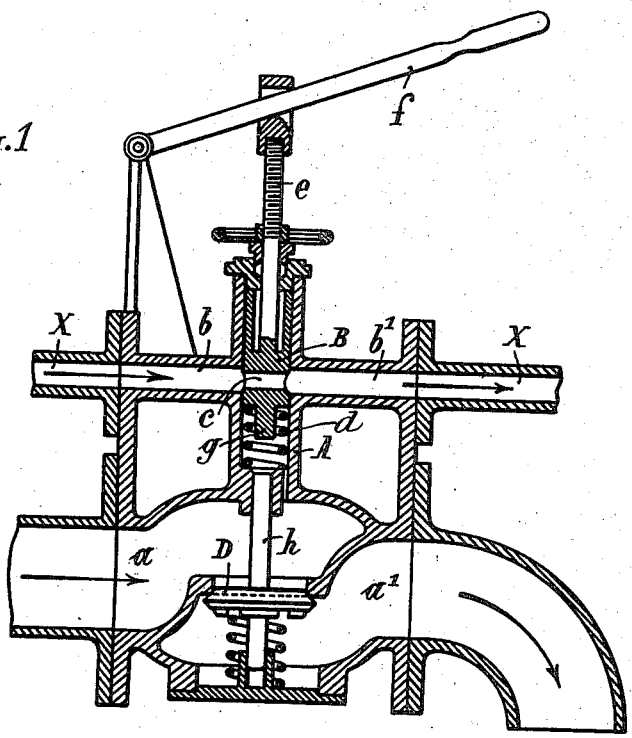

J. F. ROLLAND & P. A. P. MAUCLÈRE.
DISTRIBUTION SYSTEM FOR INFLAMMABLE LIQUIDS.
APPLICATION FILED MAR. 26, 1913.

1,168,744.

Patented Jan. 18, 1916.

WITNESSES:
Fred White
René Bruine

INVENTORS:
Jean François Rolland
and Pierre André Paul Mauclère,
By Attorneys
Fraser, Turk & Myers

UNITED STATES PATENT OFFICE.

JEAN FRANCOIS ROLLAND AND PIERRE ANDRE PAUL MAUCLÈRE, OF PARIS, FRANCE.

DISTRIBUTION SYSTEM FOR INFLAMMABLE LIQUIDS.

1,168,744.   Specification of Letters Patent.   Patented Jan. 18, 1916.

Application filed March 26, 1913. Serial No. 756,886.

*To all whom it may concern:*

Be it known that we, JEAN FRANCOIS ROLLAND and PIERRE ANDRE PAUL MAUCLÈRE, both citizens of the Republic of France, residing in Paris, France, have invented certain new and useful Improvements in Distribution Systems for Inflammable Liquids, of which the following is a specification.

In many installations, and particularly in those now required in connection with the automobile vehicle service, where a large number of vehicles are often in a depot, it is of advantage to be able to draw off petrol or other inflammable hydrocarbon at cocks or taps distributed at different points of the sheds of the installation and served by a collector reservoir placed at a lower lever, generally underground. The raising of the liquid from this lower reservoir to a distribution cock at a higher level may be obtained by the well known force pump method, which consists in causing an inert gas under pressure to act on the surface of the liquid in the reservoir. This means, however, does not suffice to satisfy the two following conditions, which the present applicants propose to realize, viz:—1. To serve all the distributing cocks for the inflammable liquid by a single conduit from the liquid reservoir located at a lower level. 2. Not to keep the inflammable liquid in this single pipe or conduit when all the cocks of the system are closed, so that if from any cause this pipe should be broken in the portion above ground, liquid cannot escape, whereby any risk of fire or other accident is avoided. These two conditions are realized with the cock forming the subject of the present invention, and which is so constructed or arranged that any desired number of these special cocks can be mounted on a single pipe or conduit; a conduit (likewise a single one) connected to the end of the liquid distributing pipe, leads to the upper part of the collector reservoir for the liquid, that is to say to the space filled with compressed gas above the liquid in the said reservoir. The new cock which thus allows of distributing an inflammable liquid at different points of a single system of piping with entire safety, presents the characteristic feature that when it is closed it establishes communication between two passages of its body or shell and which form a continuation of the compressed gas pipe connected to the collector reservoir, whereas the operation of any of the cocks of the installation has for effect to close the gas conduits of the body or shell of the cock operated, and thus to close the communication of the gas space of the reservoir with liquid distributing conduit, thus preventing the emptying of the said conduit by back flow of the liquid, and the closing of the cock operated at once reestablishes the continuity of the gas pipe, the consequence of which is that the liquid is caused to return into the reservoir from the piping.

Figure 2:
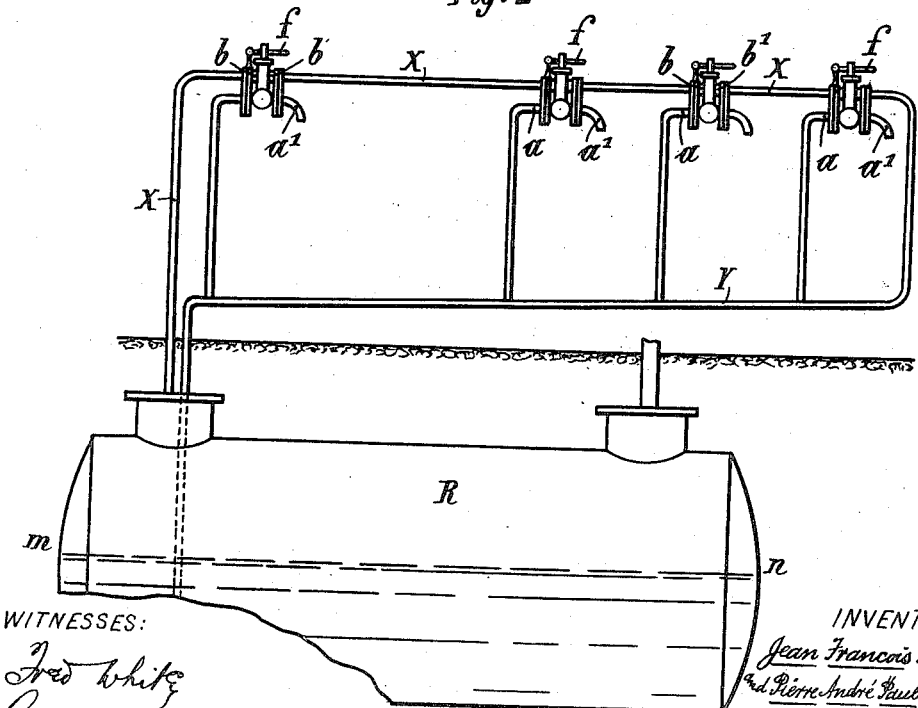

This special cock is shown in vertical section in Figure 1 of the annexed drawings. Fig. 2 is a diagrammatic figure showing one example of the mounting of a number of cocks of this kind on a single system of piping, which is the object of the arrangement.

The cock has four branches; of these, *a* serves for the admission of the liquid and *a'* for the discharge, the latter being shown with a discharge nozzle while the branches *b b'* are in alinement with each other and form so to speak a part of the piping communicating with the gas space of the liquid reservoir; the branch *b'* of one cock can be connected to the branch *b* of the next by a greater or less length of pipe. The body of the cock comprises a cylinder A into which the branches *b b'* open and containing a piston B formed with a passage *c*, which is opposite the branches *b b'* when the piston is raised by the spring *d* that acts below a washer or shoulder of the spindle *e*. *b*, *c* and *b'* coincide when the cock is not being operated and is in the position of rest shown in Fig. 1. The cock is operated by pressing down the lever *f*, which acts on the spindle *e* of the piston. The piston B has a tail *g* underneath for applying pressure on the top of the spindle *h* of the spring valve D which closes the communication between the branches *a a'* when the cock is closed, in the position of rest, and which allows the liquid to discharge when pressed down.

All the cocks of an installation are mounted by joining up two by two the branches *b b'* of two neighboring cocks so as to form a continuous pipe X (see Fig. 2), as before explained, and the branch *a* of each cock is branched on the conduit Y by which the liquid is supplied from the reservoir R. The liquid is forced as with a force-pump, by the gas under pressure that fills the space above the liquid, of which the level is shown by instance in *m n*. The branch *b* of the first cock is connected by a pipe to the gas space of the reservoir, and the branch b' of the last cock is connected to the end of the liquid pipe Y.

When all the liquid discharge cocks are closed the end of the piping Y for the liquid is in communication by the piping X with the atmosphere of gas in the reservoir. The result is that after one or more draw-offs from any of the cocks and as soon as the cocks are closed, the liquid is forced into the reservoir by the pressure of the gas, since the piping is filled by the gas under pressure from the reservoir. If leakage or breakage then occurs in the piping and even if the latter should be entirely destroyed, the gas from the reservoir escapes through the leak or break, the reservoir falls to atmospheric pressure and escape of liquid is no longer possible.

The result obtained by this system is to secure absolute safety in an installation comprising the mounting on a single system of piping of as large a number of cocks as may be necessary.

Claims:

1. A safety system for distribution of liquids, comprising a liquid reservoir, a liquid distributing pipe leading therefrom, a plurality of outlets from said distributing pipe, a pipe connected to said liquid distributing pipe adapted to admit inert gas thereto for returning the liquid in said distributing pipe to said reservoir, and means for controlling the passage through said outlets and through said gas-pipe.

2. A safety system for distribution of liquids, comprising a liquid reservoir, a liquid distributing pipe leading therefrom, a plurality of outlets from said distributing pipe, a pipe connected to said liquid distributing pipe adapted to admit inert gas thereto for returning the liquid in said distributing pipe to said reservoir, means in conjunction with each outlet for controlling the passage therethrough and through said gas pipe, said means leaving the passage through said gas pipe normally open and operating to close said passage before opening the passage through said outlets, the closing of the passage in said gas-pipe effecting the cutting off of said gas-pipe from said liquid distributing pipe, whereby said liquid distributing pipe is cut off from said gas-pipe and liquid may flow in said liquid distributing pipe and from the outlets connected thereto free from the effects of the gas-pressure in said gas-pipe.

3. A safety system for distribution of liquids comprising a liquid reservoir, a liquid distributing pipe leading therefrom, a plurality of outlets from said distributing pipe, valves in said outlets, a pipe connected to said liquid distributing pipe adapted to admit inert gas thereto for returning liquid in said distributing pipe back to said reservoir, a plurality of valves in said gas pipe, means for operating a gas valve in conjunction with said outlet valves, said valves in said gas pipe being normally open and adapted to be closed before said outlet valves are opened, the closing of said valves in said gas pipe effecting the cutting off of said gas pipe from said liquid distributing pipe, whereby said liquid distributing pipe is cut off from said gas pipe and liquid may flow in said liquid distributing pipe and from said outlets connected thereto free from the effects of the gas pressure in said gas pipe.

4. A safety system for distribution of liquids, comprising a liquid reservoir adapted to contain an inert gas above the level of the liquid therein, a liquid distributing pipe leading therefrom, a plurality of outlets from said distributing pipe, a pipe leading from said reservoir to said liquid distributing pipe adapted to admit gas from said reservoir to said distributing pipe for returning liquid in said distributing pipe to said reservoir, means for controlling the passage through said gas and liquid distributing pipes, said means leaving the passage through said gas pipe normally open and operating to close said passage before opening the passage through said distributing pipe, whereby said distributing pipe is cut off from said gas pipe, a liquid may flow in said liquid distributing pipe free from the effects of the gas pressure in said gas pipe.

5. A safety system for distribution of liquids, comprising a liquid reservoir adapted to contain an inert gas above the level of the liquid therein, a liquid distributing pipe leading therefrom, a plurality of outlets from said distributing pipe, a pipe connected to said liquid distributing pipe adapted to admit inert gas thereto for returning liquid in said distributing pipe to said reservoir, means in conjunction with each outlet for controlling the passage through said gas and liquid distributing pipe, said means comprising a valve adapted to leave the passage through said gas pipe normally open, and operating to close said passage before opening the passage through said distributing pipe, whereby said liquid distributing pipe is cut off from said gas pipe, and liquid may flow in said liquid distributing pipe free from the effects of the gas pressure in said gas pipe.

6. A safety system for distribution of liquids, comprising a liquid reservoir adapted to contain an inert gas above the level of the liquid therein, a liquid distributing pipe leading therefrom, a plurality of outlets from said distributing pipe, a pipe connected to said liquid distributing pipe adapted to admit inert gas thereto for returning liquid in said distributing pipe to said reservoir, means in conjunction with each outlet for controlling the passage through said gas and liquid distributing pipe, said means comprising a valve-proper controlling each of said passageways, one valve-proper normally providing an opening through one of said passageways, and the other valve-proper normally closing said other passageway, said first valve-proper operating to close said first passageway when the other valve-proper is operated to open said second passageway.

7. A safety system for distribution of liquids, comprising a liquid reservoir adapted to contain an inert gas above the level of the liquid therein, a liquid distributing pipe leading therefrom, a plurality of outlets from said distributing pipe, a pipe connected to said liquid distributing pipe adapted to admit inert gas thereto for returning liquid in said distributing pipe to said reservoir, means in conjunction with each outlet for controlling the passage through said gas and liquid distributing pipe, said means comprising a valve-proper for controlling each of said passageways, one valve-proper normally providing an opening through one of said passageways and the other valve-proper normally closing said other passageway, said second valve-proper being movable to open position by said first valve proper, said first valve proper closing the passageway controlled thereby when actuated to operate said other valve-proper.

8. A safety system for distribution of liquids, comprising a liquid reservoir adapted to contain an inert gas above the level of the liquid therein, a liquid distributing pipe leading therefrom, a plurality of outlets from said distributing pipe, a pipe connected to said liquid distributing pipe adapted to admit inert gas thereto for returning liquid in said distributing pipe to said reservoir, means in conjunction with each outlet for controlling the passage through said gas and liquid distributing pipe, said means comprising a valve-proper for controlling each of said passageways, one valve-proper normally providing an opening through one of said passageways and the other valve-proper normally closing said other passageway, said second valve-proper being movable to open position by said first valve proper, said first valve-proper closing the passageway controlled thereby when actuated to operate said other valve proper, said valves-proper having a loose connection between them.

9. A safety system for distribution of liquids, comprising a liquid reservoir adapted to contain an inert gas above the level of the liquid therein, a liquid distributing pipe leading therefrom, a plurality of outlets from said distributing pipe, a pipe connected to said liquid distributing pipe adapted to admit inert gas thereto for returning liquid in said distributing pipe to said reservoir, means in conjunction with each outlet for controlling the passage through said gas and liquid distributing pipe, said means comprising a valve-proper for controlling each of said passageways, means for pressing one of said valves-proper into open position, means for pressing said other valve-proper into closing position, said first valve-proper being adapted to move said second valve-proper to open position and close the passageway controlled thereby.

10. A safety system for distribution of liquids, comprising a reservoir adapted to contain liquid under pressure and an inert gas, a liquid distributing pipe, an outlet valve connected thereto, a pipe adapted to conduct gas from said reservoir to said liquid-distributing pipe, said valve controlling the passageway through said gas-pipe, and means for opening said valve to permit flow of liquid therefrom, said means closing said gas-pipe when operated to open said liquid pipe, said gas-pipe being normally in open communication with said liquid pipe whereby reservoir pressure will be exerted upon the column of liquid in said liquid pipe, and said liquid pipe will normally be emptied.

11. A safety system for distribution of liquids, comprising a reservoir adapted to contain liquid under pressure and an inert gas, a liquid distributing pipe, a gas pipe adapted to conduct gas from said reservoir to said liquid pipe, and a valve for controlling the passage of fluid and gas through said pipes, said valve having a passageway therethrough with which said liquid pipe is adapted to communicate, and a passageway with which said gas pipe is adapted to communicate, means in said valve for controlling said passageways, said gas-passageway being normally open whereby reservoir pressure will be exerted upon the column of liquid in said liquid pipe to expel liquid therefrom, said means operating to close said gas-passageway when said liquid passageway is opened.

12. A safety system for distribution of liquids, comprising a reservoir adapted to contain liquid under pressure, and an inert gas, a liquid distributing pipe, a gas-pipe adapted to conduct gas from said reservoir to said liquid pipe, branches from said liquid pipe, and a plurality of valves located therein, said valves having a passageway therethrough from said liquid pipe to an outlet, said valves also having passageways therethrough adapted to communicate on each side with said gas-pipe, said gas-passageways being normally open in the series of valves whereby reservoir pressure will be exerted upon the column of liquid in said liquid pipe to expel liquid therefrom, and means in said valves for controlling said passageways, said means operating to close said gas-passageway and thereby the gas-pipe, when said liquid-passageway in one of said valves is opened and liquid dispensed.

In witness whereof, we have hereunto signed our names in the presence of two subscribing witnesses.

JEAN FRANCOIS ROLLAND.
PIERRE ANDRE PAUL MAUCLÈRE.

Witnesses:
RENÉ BARDY,
BARTLEY F. YOST.